United States Patent
Barthel et al.

(10) Patent No.: US 6,447,930 B2
(45) Date of Patent: *Sep. 10, 2002

(54) WIRE ELECTRODE AND PROCESS FOR PRODUCING A WIRE ELECTRODE, PARTICULAR FOR A SPARK EROSION PROCESS

(75) Inventors: Bernd Barthel, Herborn-Merkenbach; Heinrich Groos, Herborn; Hans Hermanni, Sinn-Fleisbach, all of (DE)

(73) Assignee: Berkenhoff GmbH, Heuchelheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,902

(22) Filed: Feb. 11, 1998

Related U.S. Application Data

(62) Division of application No. 09/620,441, filed on Mar. 22, 1996, now Pat. No. 5,762,726.

(30) Foreign Application Priority Data

Mar. 24, 1995 (DE) .......................................... 195 10 740

(51) Int. Cl.⁷ .......................... B21D 39/00; B32B 15/04; B32B 15/20

(52) U.S. Cl. ........................ 428/621; 428/627; 428/634; 428/658; 428/674

(58) Field of Search .................................. 428/658, 674, 428/677, 621, 627, 634; 219/69.12

(56) References Cited

U.S. PATENT DOCUMENTS

| | | | | |
|---|---|---|---|---|
| 4,686,153 A | * | 8/1987 | Tominaga et al. | 428/610 |
| 4,740,666 A | * | 4/1988 | Tomalin et al. | 219/69 W |
| 4,895,765 A | * | 1/1990 | Sue et al. | 428/627 |
| 4,935,594 A | * | 6/1990 | Groos et al. | 219/69.12 |
| 4,988,552 A | * | 1/1991 | Tomalin | 428/677 |
| 5,196,665 A | * | 3/1993 | Brifford | 219/69.12 |
| 5,808,262 A | * | 9/1998 | Mukherjee | 219/69.12 |

* cited by examiner

*Primary Examiner*—D. S. Nakarani
*Assistant Examiner*—Holly C. Rickman
(74) *Attorney, Agent, or Firm*—Flynn, Thiel, Boutell & Tanis, P.C.

(57) ABSTRACT

In order to produce a wire electrode having a core consisting of a copper/zinc alloy and to produce a specific sheath layer, the sheath layer is coated onto the core at a temperature at which no diffusion occurs. The wire electrode is subsequently heated at a heating speed higher than 10° C. per second, briefly annealed at temperatures above 500° C. and subsequently cooled again very rapidly at cooling speeds higher than 10° C. per second.

10 Claims, 1 Drawing Sheet

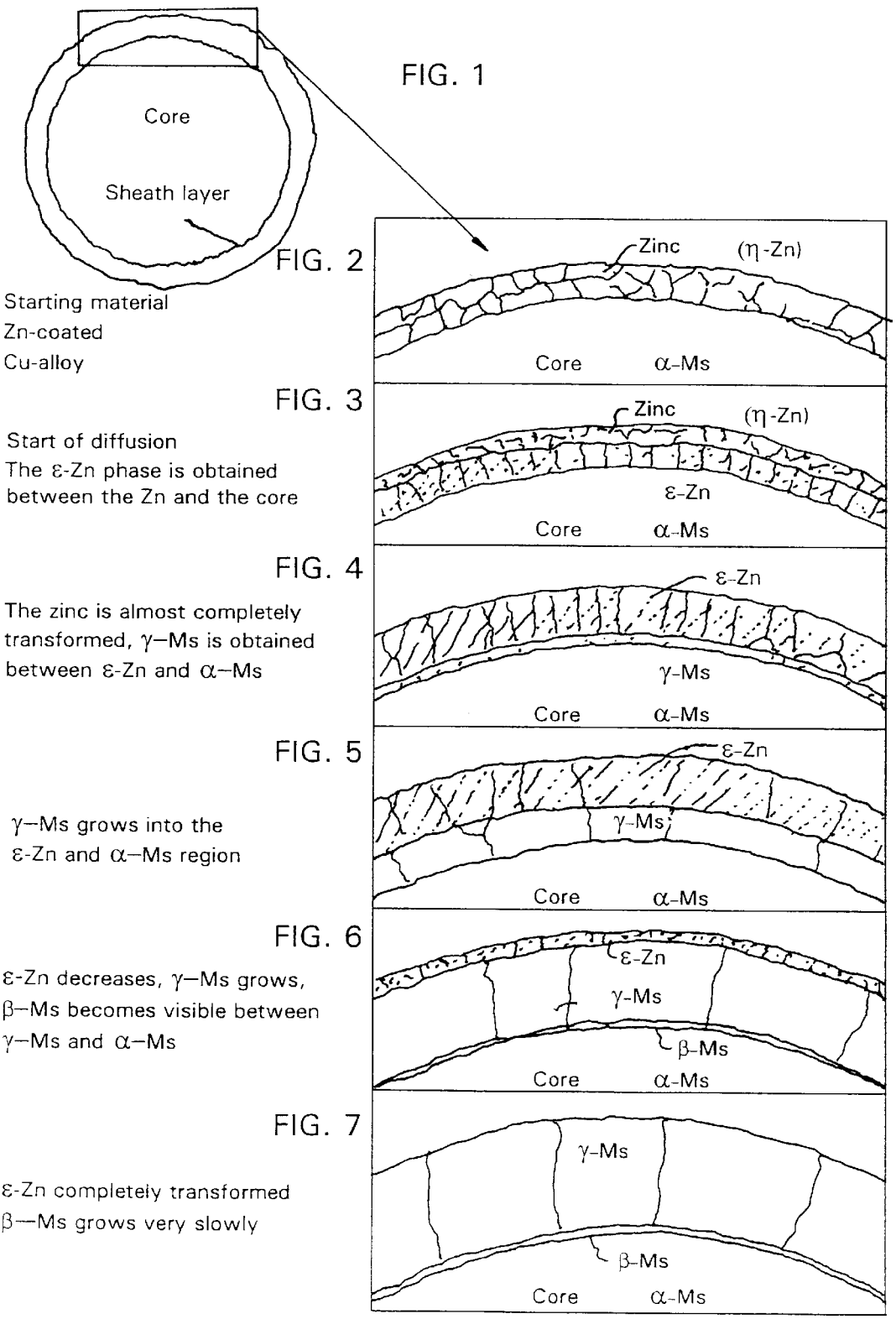

WIRE ELECTRODE AND PROCESS FOR PRODUCING A WIRE ELECTRODE, PARTICULAR FOR A SPARK EROSION PROCESS

This is a divison of Ser. No. 08/620,441 now U.S. Pat. No. 5,762,726, filed Mar. 22, 1996.

FIELD OF THE INVENTION

The invention relates to a wire electrode and to a process for producing a wire electrode, especially for the spark erosion process, with a single-layer or multi-layer core, the outer layer of which consists of copper or a copper/zinc alloy having a predominant alpha phase fraction, and with a sheath layer consisting of a zinc or a zinc alloy.

BACKGROUND OF THE INVENTION

Wire electrodes for the spark erosion process are produced, as a rule, with a high-strength core which, moreover, should also be a good electric conductor. Cores made from brass or composite cores, in which a steel nucleus is surrounded by a copper or brass layer, have proved appropriate for producing high strength. To increase the cutting capacity of wire electrodes of this type, a sheath layer, whic[0088] consists, as a rule, of zinc or a zinc alloy, is coated onto these. Very good cutting capacities have been achieved with wire electrodes provided with a pure zinc coating. However, the cutting capacity of these electrodes decreases when tall workpieces are to be cut. The reason for this is that the pure zinc of the sheath layer evaporates rapidly and is therefore consumed in a very short time, so that the wire electrode then cuts with its core material, thus again reducing the cutting capacity as a whole.

Tests have shown that, where tall workpieces are concerned, better cutting capacities are achieved when the zinc of the sheath layer is a constituent of an alloy. It has proved advantageous, here, to produce the sheath layer from a homogeneous beta brass. An electrode of this type has a very good cutting capacity even in the case of tall workpieces. A disadvantage, however, is that such an electrode is relatively cost-intensive to produce. In this case, on the one hand, an accurate alloy composition of the core must be maintained and, on the other hand, diffusion has to be carried out over a long period of time at high temperature in order to achieve a state of equilibrium. This state subsequently has to be fixed by rapid cooling. It is extremely difficult here, in this known process, to control the phase fractions in the sheath layer accurately. Slight deviations in the production process lead to the presence also of alpha and/or gamma brass in the sheath layer in addition to the beta brass.

SUMMARY OF THE INVENTION

On the one hand, the object on which the invention is based is to design a wire electrode of the type initially mentioned, in such a way that it has an even better cutting capacity than a wire electrode with a sheath layer consisting of a pure beta phase, and, on the other hand, the object on which the invention is based is to propose a process for producing wire electrodes, by which process sheath layers consisting essentially of homogeneous gamma or epsilon brass can be cost-effectively produced.

This object is achieved, as regards the process, by means of the features of the present invention. The wire electrode is defined by the features shown hereinafter. The outer sheath layer consists of a gamma or epsilon phase. Advantageously, inert hard phases can also be intercalated into the gamma or epsilon phase, thus affording the advantage that the erosion and discharge behavior of the eroding wire for the eroded materials is further improved. These inert hard phases can be formed from diamond, boronitride, a conductive ceramic or graphite.

The choice of a pure gamma phase, to which, where appropriate, hard inert materials are added, has proved even more advantageous than the beta phase in terms of cutting behavior. With conventional processes, that is to say long-time diffusion, it is scarcely possible to produce such a gamma phase in pure form. As a rule, a mixed structure having fractions of the alpha, beta and/or gamma phase is obtained.

The invention proposes a process for producing homogeneous sheath layers from gamma or epsilon brass, which utilizes states of non-equilibrium as a result of extremely short diffusion times which are caused by a high heating and a high cooling speed and by a comparatively short holding time. Surprisingly, epsilon brass first forms, then gamma brass, the gamma brass in the sheath layer having a considerably higher growth rate than beta brass which, insofar as it forms at all in the short diffusion times proposed by the invention, then experiences merely a fraction of the growth of the gamma phase. The beta phases remain, in practice, below the detection limit and are revealed merely as very small margins which delimit, relative to the core region, the gamma phase extending over the entire sheath layer. By means of this process according to the invention, it is thus possible to produce pure epsilon or gamma phases, even in wire electrodes which, in the case of conventional diffusion annealing, would exhibit a juxtaposition of alpha, beta and gamma phases.

Example 1

Core: $CuZn_5$; galvanizing 30 μm at 1.0 mm;
Drawing from 1.0 to 0.40 mm;
Annealing: heating at 200 K/s,
Annealing temperature=600° C.
Cooling speed=300 K/sec;
Drawing from 0.40 to 0.25 mm

Example 2

Core: $CuZn_5$; galvanizing 30 μm at 1.2 mm;
Drawing from 1.2 to 0.60 mm;
Annealing: heating at 40 K/s,
Annealing temperature=800° C.
Cooling speed=60 K/sec;
Drawing from 0.60 to 0.25 mm

BRIEF DESCRIPTION OF THE DRAWINGS

The invention is described below with reference to the drawings in which:

FIG. 1 shows a section through an eroding wire designed according to the invention;

FIG. 2 shows an enlarged representation of the detail of the sheath layer and of the core according to FIG. 1;

FIGS. 3 to 7 show the layers in the edge zone which form as a function of the annealing time.

DETAILED DESCRIPTION

FIG. 2 represents the starting material. This consists of a core of alpha brass and a sheath layer of zinc (eta zinc). After heating has taken place and after the shortest possible holding time, an epsilon zinc layer forms in the region between the core and sheath layer (FIG. 3), the eta zinc layer transforming into an epsilon zinc layer during an increasing annealing time and therefore increasing diffusion (FIG. 4). It is possible, in FIG. 4, to see at the same time that a narrow layer, specifically a gamma brass layer, forms in the transitional region between the core and epsilon zinc layer. While continuing the annealing time, the gamma brass layer expands, so that the epsilon zinc layer is transformed into a gamma brass layer as a result of the diffusion processes (FIG. 5). A narrow beta brass layer forms at a substantially lower growth rate in the transitional region between the gamma brass layer and the alpha brass core (FIG. 6).

FIG. 7 illustrates the moment at which the sheath layer is transformed into a gamma brass layer, with the beta brass sheath layer growing only slightly larger in the transitional region between the core and gamma brass sheath layer with respect to the stage represented in FIG. 6. Finally, FIG. 7 illustrates the end of the time sequence, in which the η-zinc layer is largely decomposed and beta crystals expand to form a thin layer around the core.

The constitution according to the invention of epsilon, gamma or beta sheath layers involves utilizing the states of non-equilibrium during the diffusion process and then interrupting the diffusion process and thus fixing the states of non-equilibrium when the particular sheath layer desired is produced. When this state is reached, the structure must be fixed by rapid cooling.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wire electrode comprising a core and a sheath formed directly on said core, said core consisting of copper, a copper/zinc alloy having an alpha fraction or having an outer layer consisting of copper or a copper/zinc alloy phase and said sheath having an outermost layer consisting of a copper/zinc alloy consisting of a gamma phase.

2. The wire electrode as claimed in claim 1, wherein graphite is added to the sheath.

3. A wire electrode comprising a core and a sheath formed directly on said core, said core consisting of copper, a copper/zinc alloy having an alpha fraction or having an outer layer consisting of copper or a copper/zinc alloy phase and said sheath having an outermost layer consisting of a copper/zinc alloy predominantly containing a gamma phase, with diamond or a conductive ceramic intercalated in the sheath.

4. The wire electrode as claimed in claim 3, wherein the conductive ceramic is a boronitride.

5. The wire electrode as claimed in claim 3, wherein graphite is added to the sheath.

6. The wire electrode as claimed in claim 4, wherein graphite is added to the sheath.

7. A wire electrode comprising a core and a sheath formed directly on said core, said core consisting of copper, a copper/zinc alloy having an alpha fraction or having an outer layer consisting of copper or a copper/zinc alloy phase and said sheath having an outermost layer consisting of a copper/zinc alloy consisting of a gamma phase, with diamond or a conductive ceramic intercalated in the sheath.

8. The wire electrode as claimed in claim 7, wherein the conductive ceramic is a boronitride.

9. The wire electrode as claimed in claim 7, wherein graphite is added to the sheath.

10. A wire electrode comprising a core and a sheath formed directly on said core, said core consisting of copper, a copper/zinc alloy having an alpha fraction or having an outer layer consisting of copper or a copper/zinc alloy phase and said sheath having an outermost layer consisting of a copper/zinc alloy predominantly containing a gamma phase.

* * * * *